(12) United States Patent
Blackmon et al.

(10) Patent No.: US 7,010,654 B2
(45) Date of Patent: Mar. 7, 2006

(54) METHODS AND SYSTEMS FOR RE-ORDERING COMMANDS TO ACCESS MEMORY

(75) Inventors: Herman L. Blackmon, Rochester, MN (US); Joseph A. Kirscht, Rochester, MN (US); James A. Marcella, Rochester, MN (US); Brian T. Vanderpool, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 10/625,956

(22) Filed: Jul. 24, 2003

(65) Prior Publication Data

US 2005/0021921 A1   Jan. 27, 2005

(51) Int. Cl.
*G06F 12/00* (2006.01)
(52) U.S. Cl. .......................... 711/158; 711/5; 711/105; 711/150; 711/151; 711/154; 711/167; 711/168
(58) Field of Classification Search ............... None
See application file for complete search history.

(56) References Cited

U.S. PATENT DOCUMENTS

| | | | |
|---|---|---|---|
| 6,622,225 B1 * | 9/2003 | Kessler et al. ............. | 711/158 |
| 2004/0059880 A1 * | 3/2004 | Bennett .................... | 711/158 |
| 2005/0097265 A1 * | 5/2005 | Shrader et al. ........... | 711/105 |

\* cited by examiner

*Primary Examiner*—Mano Padmanabhan
*Assistant Examiner*—Mehdi Namazi
(74) *Attorney, Agent, or Firm*—Patterson & Sheridan LLP

(57) ABSTRACT

Methods and systems for re-ordering commands to access memory are disclosed. Embodiments may receive a first command to access a memory bank of the memory and determine a penalty associated with the first command based upon a conflict with an access to the memory bank. The penalty, in many embodiments, may be calculated so the penalty expires when the memory bank and a data bus associated with the memory bank are available to process the first command. Then, the first command is queued and dispatched to an available sequencer after the penalty expires. After the first command is serviced, unexpired penalties of subsequent commands may be updated to reflect a conflict with the first command. Further embodiments select a command to dispatch from the commands with expired penalties, based upon priorities associated with the commands such as the order in which the commands were received and the command types.

21 Claims, 3 Drawing Sheets

SEQUENCE TRACKER

| VALID | EXTENT | BANK | SEQUENCER TO WATCH | |
|---|---|---|---|---|
| 1 | 2 | 2 | 00000 | 310 |
| 1 | 3 | 1 | 00100 | 320 |
| 0 | 2 | 3 | 00010 | 330 |
| 1 | 1 | 4 | 00001 | 340 |
| 1 | 1 | 4 | 00001 | 350 |

METHODS AND SYSTEMS FOR RE-ORDERING COMMANDS TO ACCESS MEMORY

BACKGROUND OF THE INVENTION

1. Field of the Invention

The present invention generally relates to the field of memory access in computer systems. More particularly, the present invention relates to methods and systems for re-ordering commands to access memory.

2. Description of the Related Art

Memory bottlenecks are significant issues with respect to speed and processing capacity of modern computer systems. Manufacturers continue to ramp up processor clock speeds, bus speeds and widths, and memory sizes to improve system performance but if the memory bandwidth is less than the bandwidth demanded by the processors, the processors will stall in spite of the clock and bus speeds and bus width, significantly impacting the system's overall performance.

Memory controllers play an instrumental role in determining memory bandwidth. Memory controllers provide an interface between the processors and memory, determining latencies related to memory accesses for the processors. In particular, memory controllers are responsible for accepting, e.g., load and store requests from the processors, interfacing with the memory to perform the load and store operations, and, in the case of load operations, returning the data to the processors.

The interface between the memory controller and the memory, such as synchronous random access memory (SDRAM), typically consists of command signals like a read address strobe (RAS) and a column address strobe (CAS) driven by the memory controller to the memory via a bidirectional data bus having data lines and data strobes. Each command signal driven by the memory controller typically involves a number of cycles of latency. Further, after the commands are performed on, e.g., a bank of an extent of the memory, the bank normally requires additional cycles to recover before that bank can perform another operation. For example, to implement a read or load, the memory controller opens the bank, issues a read command, waits the requisite cycles for the CAS latency, and receives a burst of data from the memory. After the data is burst to the memory controller, the bank requires several cycles to pre-charge rows (tRP) of an internal bus associated with the load.

Bandwidth issues revolve around the order in which memory accesses are performed. In particular, re-ordering commands can reduce the latencies between issuance of commands across the data bus. Current solutions focus on maximizing usage of the data bus between the memory controller and the memory (e.g. increasing usage of the data bus toward 100% of its capacity) by attempting to minimize the impact of RAS, CAS, and bus turn around penalties, i.e., latencies involved with switching between stores and loads when servicing the commands.

However, processors may issue a number of commands to the same memory bank and operations will stall if the memory bank, upon which the operation is to be performed, is still recovering from a prior access. As a result, the processor(s) may also stall, waiting for the operation to complete and the data to be returned. For instance, if the operation includes gathering code for the processor to execute, the code must be returned to the processor in a timely manner. Otherwise, the processor will wait for the code.

Therefore, there is a need for methods and systems for re-ordering commands to access memory that address latencies involved with memory banks and extents.

SUMMARY OF THE INVENTION

Embodiments of the invention generally provide methods and systems for re-ordering commands to access memory. One embodiment provides an apparatus for re-ordering commands to access memory. The apparatus generally includes an array controller having sequencers to service the commands; a first penalty box to receive a first command of the commands, the first command being associated with a memory bank of the memory, and determine a penalty associated with the first command based upon a conflict between the first command and an access to the memory bank, the penalty to expire when the memory bank and a data bus associated with the memory bank are available to process the first command; and a command queue to store the first command in a queue, update the penalty in response to a communication from the first penalty box and dispatch the first command to an available sequencer of the array controller after the penalty expires, to service the first command.

Another embodiment provides a method for re-ordering commands to access memory via an array controller having sequencers. The method may include receiving a first command to access a memory bank of the memory; determining a penalty associated with the first command based upon a conflict between the first command and an access to the memory bank, the penalty to expire when the memory bank and a data bus associated with the memory bank are available to process the first command; queuing the first command; and dispatching the first command to an available sequencer of the sequencers after the penalty expires, to service the first command.

A further embodiment provides a system for re-ordering commands. The system may include a memory having more than one memory bank; a memory controller coupled with the memory via a data bus, comprising: an array controller having sequencers to service the commands; a first penalty box to receive a first command of the commands, the first command being associated with a memory bank of the memory, and determine a penalty associated with the first command based upon a conflict between the first command and an access to the memory bank, the penalty to expire when the memory bank and the data bus are available to process the first command; and a command queue to store the first command in a queue, update the penalty in response to a communication from the first penalty box and dispatch the first command to an available sequencer of the array controller after the penalty expires, to service the first command; and a processor coupled with the memory controller to issue the commands to access the memory.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The following is a detailed description of embodiments of the invention depicted in the accompanying drawings. The embodiments are examples and are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and systems for re-ordering commands to access memory are contemplated. Embodiments may receive a first command to access a memory bank of the memory and determine a penalty associated with the first command based upon a conflict with an access to the memory bank. The penalty, in many embodiments, may be calculated so the penalty expires when the memory bank and a data bus associated with the memory bank are available to process the first command. Then, the first command is queued and dispatched to an available sequencer after the penalty expires. Several embodiments select a command to dispatch from the commands with expired penalties based upon priorities associated with the commands such as the order in which the commands were received and the types of operations associated with the commands. After the first command is serviced, penalties of subsequent commands may be updated to reflect a conflict with servicing the first command (e.g., the first command may create new conflicts). Further embodiments, allow selected commands to bypass the queue when commands in the queue are waiting for their corresponding penalties to expire and no penalty is associated with the selected commands.

Figures 1, 3:
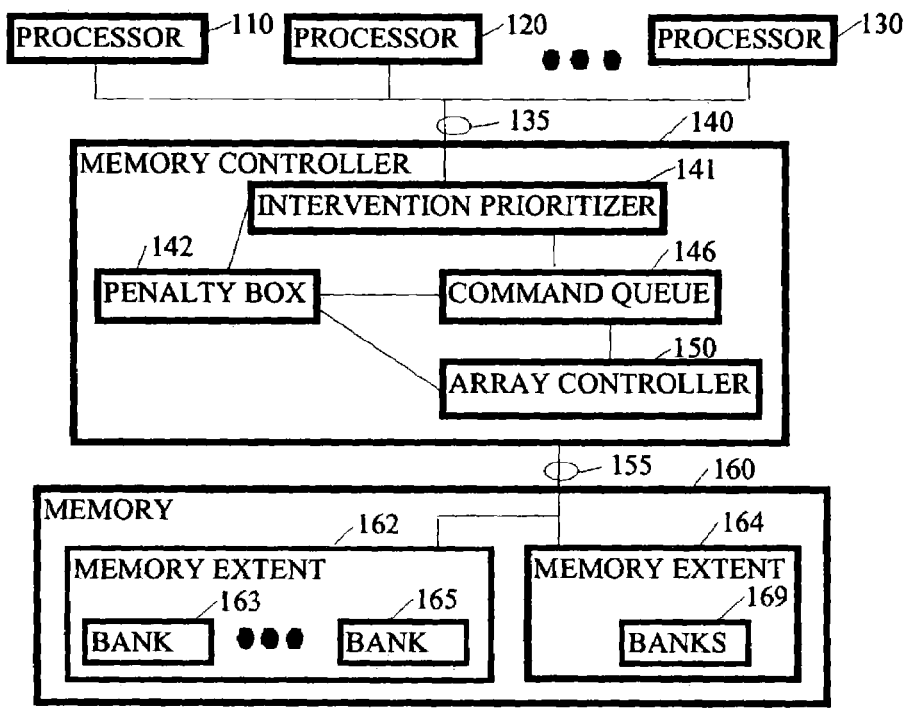
FIG. 1 is an embodiment of system including a processor, a memory controller, and memory for re-ordering commands to access memory.
FIG. 3 is an embodiment of a sequence tracker like the sequencer tracker depicted in FIG. 2 for re-ordering commands to access memory.

Turning now to the drawings, FIG. 1 depicts an embodiment of a system 100 for re-ordering commands for a computer system like IBM e-Servers. System 100 comprises processors 110, 120, and 130; memory controller 140; and memory 160. Processors 110, 120 and 130 may include general purpose processors, specific purpose processors, and/or state machines and may couple with memory controller 140 via bus 135 to issue commands such as load and store commands to access memory 160. Although the FIG. 1 depicts three processors, any number of one or more processors is contemplated.

Memory controller 140 may include a controller for cache, main memory for system 100, or other memory and may couple with memory via a data bus 155 to re-order commands to access memory 160 based upon priorities and latencies associated with servicing the commands. Memory controller 140 may include intervention prioritizer 141, penalty box 142, command queue 146, and array controller 150.

Intervention prioritizer 141 monitiors bus 135 for snoops of processors. In particular, intervention prioritizer 141 recognizes interventions that affect a command issued by a processor like processor 110 to memory controller 140 or indicate that a load command may be forthcoming. For example, processor 110 may issue a load command to memory controller 140 to retrieve the contents of a memory location in memory 160, such as data for code that processor 110 is executing. Processor 120 may snoop the load command and issue an intervention, such as a HITM, that indicates processor 120 has a newer, modified version of the data in that memory location, stored in cache associated with processor 120. Upon recognizing the intervention, intervention prioritizer 141 may cancel the load command received from processor 110 while the load command is stored in command queue 146 and issue or initiate a store command to store the modified contents in the memory location. In many embodiments, the store command is also associated with a high priority so the store command is processed faster and the modified contents are available for other load commands.

On the other hand, when processor 110 issues a store command and the intervention, e.g. a HIT, from processor 120 indicates that processor 120 has a copy of the contents of the same memory location in cache, processor 120 may invalidate the entry in the cache. Intervention prioritizer 141 may recognize the intervention and, in some embodiments, issue a speculative load command for processor 120, anticipating that processor 120 and/or other processor will issue a load command for the new data stored in the memory location by the store command.

Penalty box 142 may track penalties of sequencers based upon latencies associated with servicing commands and communicate expirations of the penalties to command queue 146. More specifically, penalty box 142 determines a penalty for a command and when a sequencer services that command, the penalty is associated with the sequencer and decremented (or incremented in other embodiments) based upon clock cycles. After the penalty associated with that sequencer expires, data bus 155 and the memory bank associated with the command are available to process a subsequent command to the memory bank. For example, penalty box 142 receives a store command, captures the memory extent, memory extent 162, and the memory bank, bank 163. Penalty box 142 then determines the latency in cycles, or penalty, associated with the store command and stores the penalty. Once a sequencer of array controller 150 services the store command, array controller 150 communicates with penalty box 142 to indicate that the sequencer serviced the command.

Then, penalty box 142 begins decrementing the penalty based upon clock cycles. When a subsequent command associated with memory extent 162 and bank 163 is received from a processor, that subsequent command is associated with the sequencer and the penalty (currently being decremented) when transferred to command queue 146. The penalty associated with the subsequent command is also determined and stored by penalty box 142. Upon expiration of the penalty, penalty box 142 transmits a sequencer expiration vector to command queue 146 to indicate that the penalty associated with the sequencer has expired, indicating that queued commands associated with that sequencer are now valid, or, in other words, can be serviced by the next available sequencer without stalling.

In some embodiments, penalty box 142 also selects a path for the command. For instance, penalty box 142 may indicate that the command should wait in command queue 146 until the command has priority over other commands waiting in command queue 146, such as when the command becomes the oldest command in command queue 146. Or penalty box 142 may indicate that the command should take a fast path through command queue 146 to array controller 150, advantageously incurring only a cycle of latency in many embodiments. Penalty box 142 may select commands for the fast path when the commands have no conflicts with memory accesses (no penalty), no valid commands reside in command queue 146, and a sequencer of array controller 150 is available to service the commands.

Command queue 146 may include one or more queues to store commands waiting for dispatch to array controller 150. Command queue 146 may also update penalties associated with commands that remain in the queue in response to a communication from penalty box 142 indicating a penalty associated with a sequencer has expired, or upon dispatching a command to a sequencer based upon a memory extent and bank associated with the command. Commands may be dispatched by command queue 146 to an available sequencer of array controller 150 when the commands that are valid (after the penalty expires), based upon a priority associated with the command. For example, command queue 146 may receive an expiration vector from penalty box 142 indicating that all commands associated with sequencer one are now valid. In response, command queue 146 updates each command associated with sequencer one to indicate the command is valid. When the next sequencer, sequencer two, becomes available, command queue 146 selects a command waiting in a queue, such as a store queue, based upon a priority associated with servicing the command and dispatches the selected command to sequencer two of array controller 150. Then, command queue 146 updates the remaining commands associated with the same memory extent and bank as the selected command, to indicate that the commands are invalid because sequencer two is the most recent sequencer that serviced a command for the same memory extent and bank and that, until the penalty associated with the sequencer two has expired, a latency is associated with processing those commands in the memory bank.

In further embodiments, memory controller 140 may include one or more additional penalty boxes to track more than one penalty associated with the sequencers of array controller 150. The additional penalty boxes may track additional penalties associated with the sequencers after memory controller 140 dispatches commands directly to array controller 150. For instance, when penalties are associated with all the sequencers and no commands in the command queue are valid, but at least one sequencer is available to service a command and a command is received that is associated with a memory extent and bank in which no access has been serviced, the command may be dispatched to the available sequencer and one of the additional penalty boxes may track the additional penalty associated with the sequencer.

Array controller 150 includes a number of sequencers, such as five, to service the commands to access memory 160. The sequencers operate substantially independent of one another on any of the memory banks in any memory extent. In many embodiments, access to memory 160 by the sequencers is coordinated by a bus arbiter for data bus 155 and, in several of these embodiments, the bus arbiter arbitrates access to the sequencers in a round robin manner. However, in other embodiments, different arbitration schemes may be implemented.

Memory 160 may include memory such random access memory (RAM) serving as cache, main memory, or other memory for system 100. Memory 160 includes more than one memory extent, memory extents 162 and 167, each having one or more memory banks like banks 163, 165, and 169.

Figure 2:
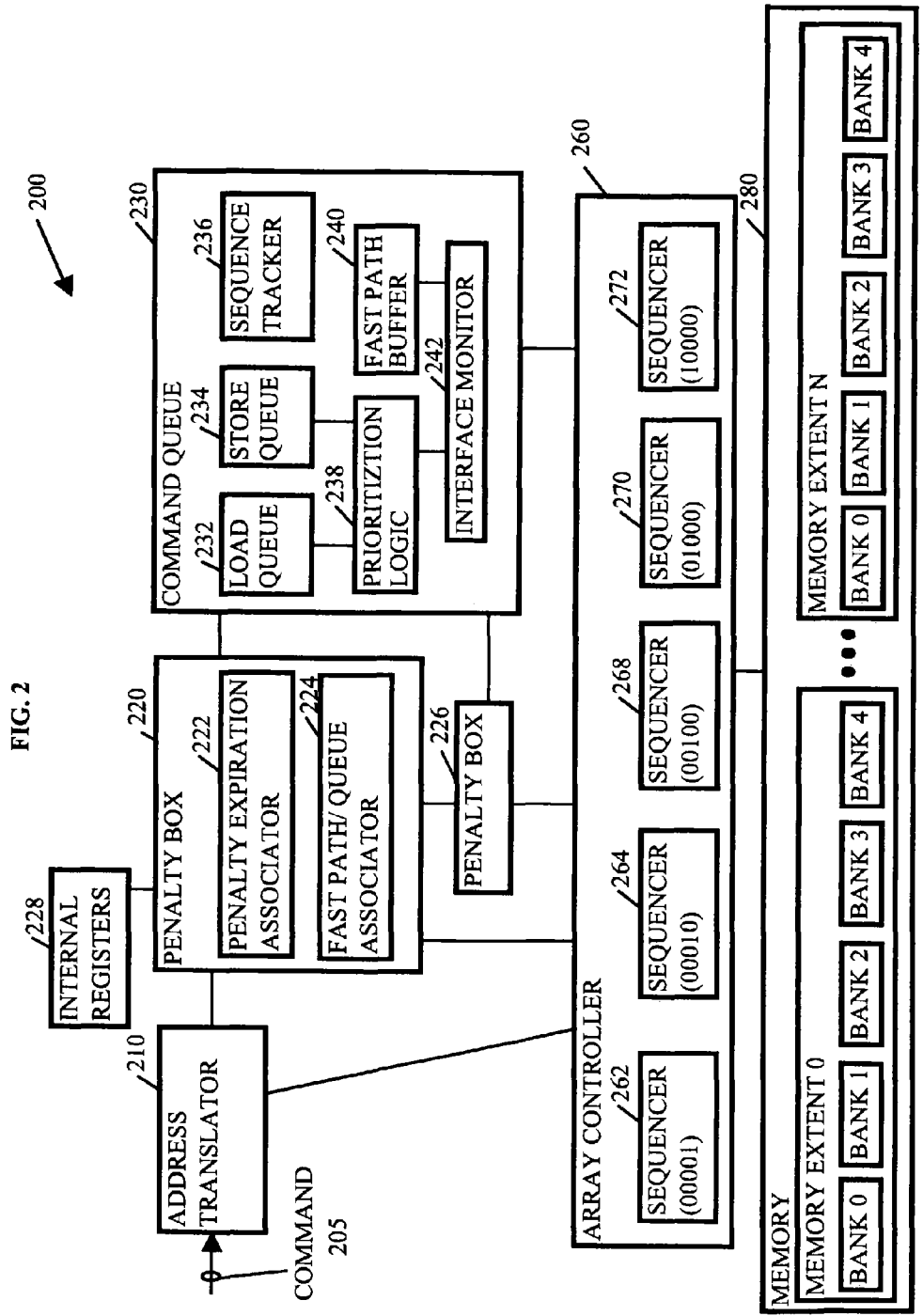
FIG. 2 is an embodiment of an apparatus having a penalty box, a command queue, and an array controller for re-ordering commands to access memory.

Referring now to FIG. 2, there is shown an embodiment of an apparatus 200 for re-ordering commands to access memory 280. Apparatus 200 may include a specific purpose system like a state machines or specific purpose processors, a general purpose machine configured by software to execute aspects of the invention, combinations of the two, or the like. In particular, apparatus 200 may receive processor commands 205 to access memory 280 such as load commands and store commands and re-order the commands based upon latencies associated with servicing the commands and priorities associated with the commands, to reduce latencies involved with accessing memory 280. Apparatus 200 includes an address translator 210, a penalty box 220, a penalty box 226, internal registers 228, a command queue 230, an array controller 260, and memory 280.

Address translator 210 receives a command 205 from a processor and translates the address. In particular, a real address is appended or otherwise incorporated into command 205 and address translator 210 couples with array controller 260 to convert the address into a physical address that describes the memory extent and bank for which the command is intended to perform an operation. Operations may include, for instance, loading data from the memory location or storing data to the memory location. In many embodiments, address translator 210 also verifies that the memory address associated with command 205 is a valid address.

After translating the address, command 205 is forwarded to penalty box 220. Penalty box 220 may receive the command and determine a penalty associated with the command via internal registers 228, based upon a conflict between the command and another access to the same memory extent and memory bank. For example, internal registers 228 may include programmable penalty counts for, e.g. load, store, read-modify-write, and refresh commands, and penalty box 220 may access or request the penalty associated with command 205. Penalty box 220 may then store the penalty and await receipt of a start penalty decrement vector from array controller 260 to associate the penalty with a sequencer and to start counting clock cycles to determine when the penalty expires.

Penalty box 220 includes penalty expiration associator 222 and fast path/queue associator 224. Penalty expiration associator 222 associates command 205 with a sequencer, like sequencer 262, that has a penalty resulting from an access to the same memory extent and memory bank of memory 280 as command 205. Then, penalty expiration associator 222 transmits a sequence expiration vector to command buffer 230 when a penalty associated with a sequencer expires. For example, sequencer 262 may service a load from memory extent zero, bank zero of memory 280. Array controller 260 transmits a start penalty decrement vector for the command and penalty box 220 begins to decrement the penalty in response to the rising edge of each clock cycle. When command 205 is received and is associated with memory extent zero and memory bank zero of memory 280, penalty expiration associator 222 associates command 205 with sequencer 262, effectively associating processor command 205 with the penalty being decremented for sequencer 262, before forwarding command 205 to command queue 230.

When penalty expiration associator 222 determines that command 205 is not associated with a penalty for a sequencer and penalty box 220 receives an indication from array controller 260 that a sequencer like sequencer 264 is available, but all the sequencers of array controller 260 are associated with a penalty, penalty box 220 may be designed to operate in conjunction with a second penalty box like penalty box 250 to associate a second penalty with sequencer 264. More specifically, penalty box 220 may determine that sequencer 264 became available prior to the expiration of the penalty against sequencer 264 because the memory bank most recently accessed by sequencer 264 is unavailable to process a command. Further, when penalty box 220 recognizes that no commands have been dispatched from command queue 230, meaning that no commands in the command queue are valid, penalty box 220 forwards processor command 205 to penalty box 226 so that penalty box 226 can track a second penalty for sequencer 264. Command 205 may then be dispatched directly to sequencer 264. In other embodiments, the functionality of penalty box 220 and penalty box 226 may be built in a single unit capable of tracking more than one penalty for a sequencer, or any other suitable arrangement allowing one or more penalty boxes to effectively maintain a larger number of penalties and associated sequencers may also be utilized.

Fast path/queue associator 224 may associate processor command 205 with a fast path buffer or a queue of command queue 230. In particular, when penalty box 220 determines that command 205 is not associated with a penalty for a sequencer and penalty box 220 receives an indication from array controller 260 that a sequencer like sequencer 264 is available and at least one of the sequencers of array controller 260 is not associated with a penalty, fast path/queue associator 224 forwards an indication along with command 205 to dispatch processor command 205 to an available sequencer of array controller 260 instead of placing the command 205 in a queue. Otherwise, fast path/queue associator 224 associates command 205 with an indication to store command 205 in a queue like load queue 232 or store queue 234.

Penalty box 226 handles secondary penalties associated with sequencers of array controller 260. More specifically, penalty box 226 receives command 205, stores a penalty associated with command 205, dispatches command 205 to an available sequencer in array controller 260, and begins to decrement the penalty upon confirmation that command 205 has been serviced from array controller 260. Further, penalty box 226 communicates with penalty box 220 to associate secondary penalties tracked by penalty box 226 with commands subsequently received by penalty box 220 and transmits a sequence expiration vector to command queue 230 upon expiration of secondary penalties.

Command queue 230 may store commands in queues and dispatch the commands to array controller 260 in an order based upon the order that penalties associated with the commands expire. In particular, command queue 230 may store command 205 in load queue 232, store queue 234, or fast path buffer 240 based upon an indication from fast path/queue 224, update the penalties associated with commands in load queue 232 and store queue 234 via sequence tracker 236 in response to a communication from the penalty box 220, and dispatch command 205 to an available sequencer of array controller 260 after the penalty expires, to service command 205. In the present embodiment, command queue 230 includes fast path buffer 240 to dispatch commands received from penalty box 220 to an available or the next available sequencer of array controller 260.

Command queue 230 may include load queue 232, store queue 234, sequencer tracker 236, prioritization logic 238, fast path buffer 240, and interface monitor 242. Generally speaking, load queue 232 and store queue 234 retain commands for loads, or fetches, and stores, or writes, respectively, in the order received to maintain a priority based upon order of receipt from processors such as FIFO queues. Sequence tracker 236 maintains associations between the commands in the queues and associated sequencers to track penalties for the commands. Then, prioritization logic 238 selects between commands with expired penalties based upon priorities associated with the commands and dispatches the commands as sequencers become available to receive the commands.

More specifically, sequence tracker 236 maintains data associated with entries in the load queue 232 and store queue 234 such as an indication regarding whether the command is valid, meaning that the penalty associated with the command has expired, the memory extent and bank associated with the commands, and the sequencer to watch, or the sequencer that most recently serviced a command that creates a conflict with the memory extent and bank associated with the corresponding commands in the load queue 232 or store queue 234. FIG. 3 describes an example of a sequence tracker 300 that may be utilized for the embodiment in FIG. 4.

FIG. 3 depicts a table of data having rows 310 through 350, wherein each row is associated with an entry in the load queue 232 or the store queue 234. In particular, each row includes four columns of entries: "Valid", "Extent", "Bank", and "Sequencer to Watch". In this example, the valid column includes a "1" to indicate that the penalty associated with the corresponding command has expired and is a valid selection for prioritization logic 238. Thus, the command associated with row 310 is associated with an expired penalty and can be selected for dispatch by prioritization logic 238.

The "extent" and "bank" columns include data representing the memory extent and bank associated with the corresponding command. Thus, the command associated with row 330 will perform an operation in memory extent 2, bank 3 of memory 280. And the "sequencer to watch" column includes data identifying the sequencer that most recently serviced a command that created a conflict with the command associated with the row. For instance, in rows 340 and 350, the sequencer identified by "00001", sequencer 262 of array controller 260, most recently serviced a command for memory extent 1, bank 4 of memory 280, which conflicts with the commands associated with rows 340 and 350.

Row 310, however, indicates a sequencer to watch of "00000", which does not correspond to a sequencer in array controller 260. The data "00000" was selected, in this embodiment, to describe a command that is not associated with a penalty because no sequencer of array controller 260 is associated with a penalty for servicing a command for memory extent 2, bank 2.

Referring again to FIG. 2, prioritization logic 238 selects a command to dispatch from the valid commands in load queue 232 and store queue 234. In the present embodiment, a default priority is given to commands that are in load queue 234. However, when the number of commands waiting in the store queue 234 reach a specified number, which is typically less than the total number of entries available in store queue 234 to avoid rejection of subsequent entries, commands in store queue 234 are given priority until the number of commands in store queue 234 drops to a selected minimum number such as zero. Prioritization logic 238 provides the highest priority to commands in fast path buffer 240, advantageously allowing commands selected by penalty box 220 to bypass commands in the load and store queues 232 and 234. In several embodiments, commands received by fast path buffer 240 incur only a one-cycle latency in command queue 230. In many embodiments, additional priorities may be associated with command in load queue 232 and store queue 234. Prioritization logic 242 may recognize the priorities when selecting a command from the queues to dispatch to the next available sequencer of array controller 260.

Interface monitor 242 may monitor commands dispatched from load and store queues 232 and 234, and from fast path buffer 240 to array controller 260. In addition, interface monitor 242 may update associations between commands remaining in load and store queues 232 and 234, and the sequencers of array controller 260 based upon conflicts associated with the commands dispatched. In particular, interface monitor 242 updates the data in sequence tracker 236 like data in the "Valid" and "Sequencer to Watch" columns described in FIG. 3. For example, looking at FIG. 3, when prioritization logic 238 selects and dispatches the command associated with row 350 to sequencer 268, interface monitor 242 updates the data in row 340 to show the command is now invalid by placing a "0" in the "Valid" column and the sequencer that most recently serviced a command having a conflict is sequencer 268 by placing "00100" in the "Sequencer to Watch" column. The penalty for command associated with row 340 was updated because the dispatched command, as shown in row 350, was processed by the same memory extent and bank, memory extent 1, bank 4.

Array controller 260 includes sequencers 262 through 272 designed to service commands for access to memory 280. In the present embodiment, the sequencers service commands, independent of the memory extent and bank associated with the commands. However, any number of sequencers is contemplated.

Memory 280 may include a dynamic random access memory (DRAM) or other type of memory. Memory 280 includes memory extents 0 through N, each having banks 0 through 4. However, other configurations are also contemplated.

Figure 4:
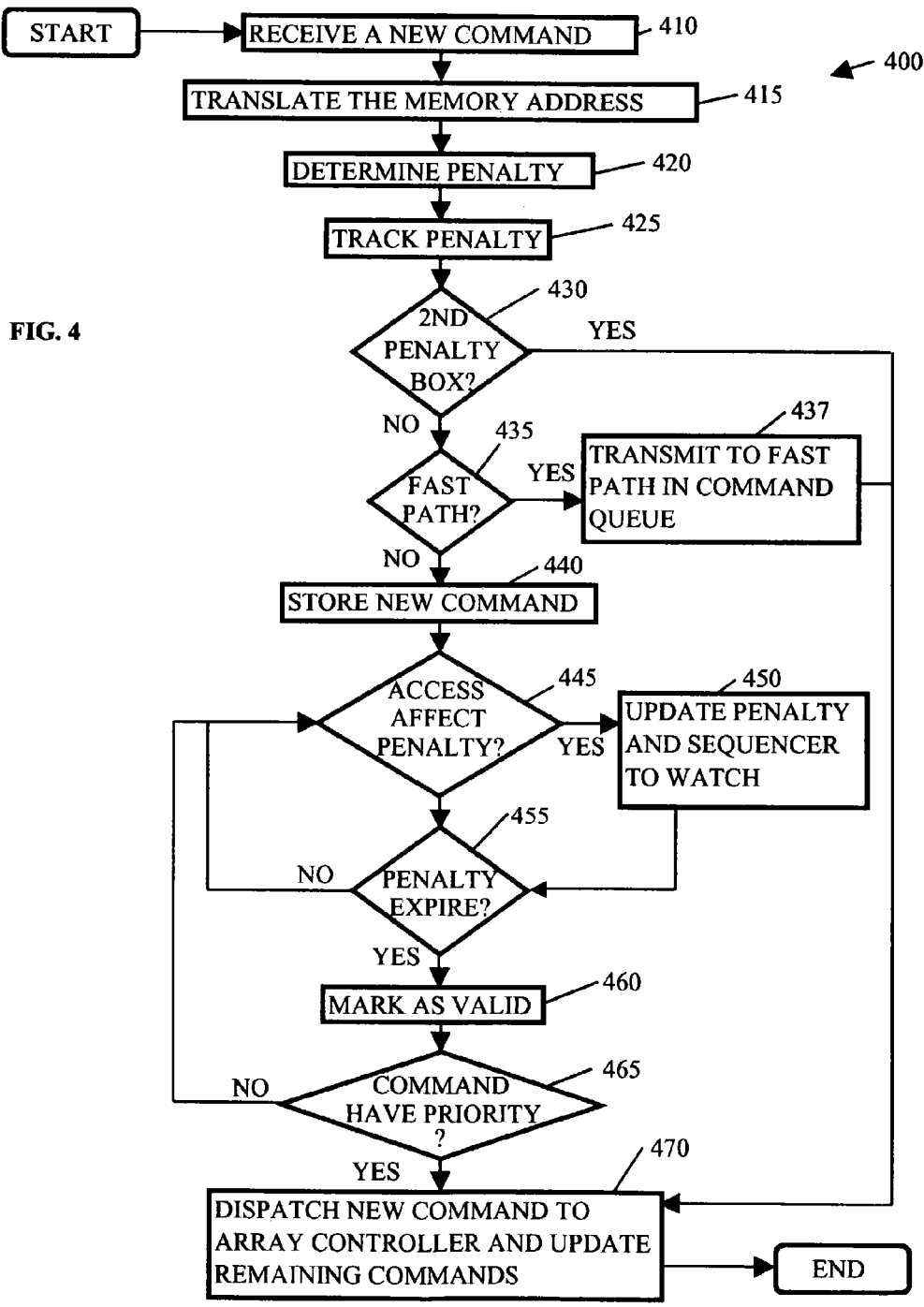
FIG. 4 depicts an example of a flow chart for a method to re-order commands to access memory.

FIG. 4 depicts an example of a flow chart 400 for a method for re-ordering commands to access memory via an array controller having sequencers. Flow chart 400 begins with element 410, receiving a new command. Element 410 may involve receiving a command to read or load data from, store data to, refresh or perform some other operation to a memory extent and bank, such as synchronous dynamic random access memory (SDRAM). The commands may also involve more than one cycle to recover prior to being able to perform a subsequent operation. For example, servicing a load command may involve issuing a read, waiting a number of cycles for a column address strobe CAS latency, retrieving data, and waiting a time for the row to pre-charge (tRP). Servicing a store command may involve issuing a write, waiting a number of cycles for a CAS latency, bursting the data on to a data bus, and waiting for a time to write recovery (tWR) and the tRP. And servicing a refresh of memory may involve latencies of a clock cycle to issue the refresh as well as, e.g. eight cycles to perform the refresh.

Element 415 translates a memory address associated with the new command to determine the memory extent and the bank associated with the new command. Then, element 420 determines a penalty associated with the new command. In many embodiments, determining the penalty involves determining the amount of time that the new command may wait for latencies involved with a conflicting command. For example, when another command is being serviced or was previously serviced, a CAS, tRP, tWR, and/or bus turn around penalty may still be associated with the memory bank so the new command will have to wait for the requisite number of cycles before being serviced.

In several embodiments, penalties resulting from conflicting commands may be tracked by associating the penalties with sequencers as the sequencers service the commands, tracking the memory extents and banks associated with the corresponding sequencers, and decrementing the penalties with passage of clock cycles (element 425). Then, penalties may be associated with the new command by finding the sequencer associated with the same memory extent and bank.

However, if the command is not associated with a penalty of a sequencer and at least one of the sequencers is available to service a command, decision elements 430 and 435 determine whether the command should be dispatched to the next available sequencer. In particular, element 430 dispatches the new command to the next available sequencer (element 470) when all the sequencers are associated with penalties and none of the commands waiting to be serviced, if any, can be dispatched because they are associated with penalties. Similarly, element 435 dispatches the new command to the next available sequencer (element 470) via a fast path of a command queue (element 437) when at least one of the sequencers is not associated with a penalty and none of the commands waiting to be serviced, if any, can be dispatched because they are associated with penalties. For example, all the sequencers may service refresh commands for memory extents 0 through 4 and all the commands received prior to the new command may be operations associated with memory extents 0 through 4. Accordingly, the sequencers may be available after one cycle but memory extents 0 through 4 may remain unavailable for eight cycles. Thus, if the new command is associated with memory extent 5, element 430 dispatches the new command to the next available sequencer in element 470. The new penalty associated with that sequencer is then tracked as a second penalty so that the second penalty, the penalty for memory extent 5, can be associated with subsequently received commands, and the first penalty, the penalty for the refreshes, can continue to be tracked for the commands that are waiting to access memory extents 0 through 4.

When the new command is associated with a penalty of one of the sequencers, the command is stored in a command queue in element 440. In addition, element 440 associates the entry for the new command in the command queue with an invalid indicator and a sequencer to watch. The invalid indicator identifies the new command as a command waiting for a penalty to expire and the sequencer to watch identifies the sequencer that is associated with that penalty.

While the new command waits in the command queue, a command may be dispatched to a sequencer and element 445 determines whether the issued command conflicts with the new command. For instance, the issued command may perform an operation on the same memory extent and bank as the new command.

When issued command conflicts with the new command, the sequencer that serviced the issued command is identified as the sequencer to watch for the new command in element 450. On the other hand, when issued command does not conflict with the new command, element 450 is skipped and element 455 determines whether the penalty associated with the new command has expired. More specifically, element 455 determines whether the penalty for the sequencer identified by the corresponding sequencer to watch has expired, e.g. decremented to zero. If not, the new command continues to wait, affording the opportunity for another issued command to affect the new command's penalty via elements 445 and 450.

After the penalty associated with the new command has expired, the new command is marked as valid 460 and is available to be dispatched to the array controller. However, if the new command does not have the highest priority to be dispatched (element 465) the new command continues to wait, affording the opportunity for another issued command to affect the new command's penalty via elements 445 and 450. For instance, a command issued while the new command continues to wait may have been waiting longer in the command queue so that issued command had a priority based upon the order that the valid commands were received. When that issued command performs an operation on the memory extent and bank associated with the new command, the new command is marked as invalid and the penalty resulting from the issued command is associated with the new command in element 450.

Element 470 dispatches the new command to the array controller after the penalty associated with the new command expires and the new command has the highest priority of the commands in the command queue. Further, element 470 updates penalties associated with any remaining commands in the command queue that include operations on the same memory extent and bank as the new command.

While the foregoing is directed to embodiments of the present invention, other and further embodiments of the invention may be devised without departing from the basic scope thereof, and the scope thereof is determined by the claims that follow.

What is claimed is:

1. An apparatus for re-ordering commands to access memory, the apparatus comprising:
    an array controller having sequencers to service the commands;
    a first penalty box to receive a first command of the commands, the first command being associated with a memory bank of the memory, and determine a penalty associated with the first command based upon a conflict between the first command and an access to the memory bank, the penalty to expire when the memory bank and a data bus associated with the memory bank are available to process the first command; and
    a command queue to store the first command in a queue, update the penalty in response to a communication from the first penalty box and dispatch the first command to an available sequencer of the array controller after the penalty expires, to service the first command.

2. The apparatus of claim 1, further comprising a second penalty box to track a second penalty associated with the available sequencer in response to dispatching a second command to the available sequencer, wherein the second command has no conflict with accesses to the memory and the available sequencer is associated with an unexpired penalty.

3. The apparatus of claim 1, wherein the first penalty box comprises a fast path associator to associate a second command with a fast path buffer of the command queue, wherein the second command has no conflicts with accesses to the memory and a sequencer of the sequencers is available to service the second command.

4. The apparatus of claim 1, wherein the first penalty box comprises a penalty expiration associator to communicate the expiration of the first penalty to the command queue.

5. The apparatus of claim 1, wherein the command queue comprises
    a load queue to store the first command when the first command is a load command;
    a store queue to store the first command when the first command is store command; and
    a sequence tracker to associate the first command with the penalty.

6. The apparatus of claim 5, wherein the sequence maintains an indication of the status of the penalty and identifies a sequencer of the sequencers that is associated with the penalty.

7. The apparatus of claim 1, wherein the command queue comprises a prioritization logic to select the first command from the command queue based upon a priority associated with the first command after the penalty expires, and to dispatch the first command to the available sequencer.

8. The apparatus of claim 1, wherein the command queue comprises an interface monitor to monitor commands dispatched from the command queue to the array controller, and to update associations between commands remaining in the command queue and the sequencers, based upon conflicts associated with the commands dispatched.

9. A method for re-ordering commands to access memory via an array controller having sequencers, the method comprising:
    receiving a first command to access a memory bank of the memory;
    determining a penalty associated with the first command based upon a conflict between the first command and an access to the memory bank, the penalty to expire when the memory bank and a data bus associated with the memory bank are available to process the first command;
    queuing the first command; and
    dispatching the first command to an available sequencer of the sequencers after the penalty expires, to service the first command.

10. The method of claim 9, further comprising:
    monitoring for a processor intervention;
    canceling the first command and initiating a store command in response to the processor intervention, wherein the processor intervention indicates that a modified content is associated with the first command and the first command is a load command; and
    initiating a speculative load command associated with the first command in response to the processor intervention wherein the processor intervention indicates that a cache entry is invalid.

11. The method of claim 9, further comprising:
    receiving a subsequent command having no conflict with accesses to the memory and
    dispatching the subsequent command prior to dispatching the first command.

12. The method of claim 9, wherein determining a penalty comprises:
    determining a latency associated with the first command, resulting from the access to the memory bank;
    associating the latency with a sequencer of the sequencers that serviced the access;
    associating the sequencer with the first command; and
    decrementing the latency based upon passage of clock cycles in response to an indication that the access has been serviced, to determine when the penalty expires.

13. The method of claim 12, wherein queuing the first command comprises storing the status of the penalty associated with the first command and associating the status with a sequencer of the sequencers, wherein the sequencer serviced the access, to determine when the status of the penalty changes.

14. The method of claim 9, further comprising updating a penalty associated with the first command in response to a conflicting access to the memory bank created by servicing another command.

15. The method of claim 9, wherein queuing the first command comprises storing the first command in a load queue, wherein the first command comprises a load operation for the memory bank.

16. The method of claim 9, wherein queuing the first command comprises storing the first command in a store queue, wherein the first command comprises a store operation for the memory bank.

17. The method of claim 9, wherein dispatching the first command comprises selecting the first command after the penalty expires, based upon a priority associated with the first command.

18. A system for re-ordering commands, the system comprising:
 a memory having more than one memory bank;
 a memory controller coupled with the memory via a data bus, comprising
  an array controller having sequencers to service the commands;
  a first penalty box to receive a first command of the commands, the first command being associated with a memory bank of the memory, and to determine a penalty associated with the first command based upon a conflict between the first command and an access to the memory bank, the penalty to expire when the memory bank and the data bus are available to process the first command; and
  a command queue to store the first command in a queue, update the penalty in response to a communication from the first penalty box and dispatch the first command to an available sequencer of the array controller after the penalty expires, to service the first command; and
 a processor coupled with the memory controller to issue the commands to access the memory.

19. The system of claim 18, wherein the memory controller comprises a second penalty box to track a second penalty associated with the available sequencer in response to dispatching a second command to the available sequencer, wherein the second command has no conflict with accesses to the memory and the available sequencer is associated with an unexpired penalty.

20. The system of claim 18, wherein the memory controller comprises an intervention prioritizer to recognize an intervention initiated by the processor to indicate a modified content associated with a load command of a second processor, to cancel the load command, and to associate a priority with a store command for the modified content.

21. The system of claim 18, wherein the memory controller comprises an intervention prioritizer to recognize an intervention initiated by the processor and to initiate a speculative read for the processor in response to the intervention.

* * * * *